(12) United States Patent
Agarwal et al.

(10) Patent No.: US 11,864,148 B2
(45) Date of Patent: Jan. 2, 2024

(54) EVENT TRIGGERED NETWORK MIGRATION OF SUBSCRIBERS

(71) Applicant: T-Mobile Innovations LLC, Overland Park, KS (US)

(72) Inventors: Mukesh Agarwal, Wildwood, MO (US); Ryan P. Dreiling, Shawnee, KS (US); Philip Warren Uehling, Olathe, KS (US); Vijay Bhanu Reddy Yelmat, Phoenix, AZ (US)

(73) Assignee: T-Mobile Innovatons LLC, Overland Park, KS (US)

( * ) Notice: Subject to any disclaimer, the term of this patent is extended or adjusted under 35 U.S.C. 154(b) by 35 days.

(21) Appl. No.: 17/670,376

(22) Filed: Feb. 11, 2022

(65) Prior Publication Data
US 2023/0262641 A1   Aug. 17, 2023

(51) Int. Cl.
| | |
|---|---|
| *H04W 4/50* | (2018.01) |
| *H04W 60/04* | (2009.01) |
| *H04M 15/00* | (2006.01) |
| *H04W 8/26* | (2009.01) |

(52) U.S. Cl.
CPC .......... *H04W 60/04* (2013.01); *H04M 15/49* (2013.01); *H04M 15/887* (2013.01); *H04W 4/50* (2018.02); *H04W 8/265* (2013.01)

(58) Field of Classification Search
CPC ........ H04W 60/04; H04W 4/50; H04W 8/265
See application file for complete search history.

(56) References Cited

U.S. PATENT DOCUMENTS

| | | | |
|---|---|---|---|
| 11,129,026 B1 | 9/2021 | Kanakrai et al. | |
| 2003/0027581 A1* | 2/2003 | Jokinen | ................... H04L 67/30 455/466 |
| 2006/0129638 A1* | 6/2006 | Deakin | ................... H04W 8/22 709/203 |
| 2009/0196269 A1* | 8/2009 | Agarwal | ............... H04W 72/56 370/341 |
| 2014/0273968 A1* | 9/2014 | Agarwal | ............. H04L 63/0876 455/411 |

(Continued)

FOREIGN PATENT DOCUMENTS

EP    3016421 A1    1/2022

OTHER PUBLICATIONS

Foreign Communication From a Related Counterpart Application, International Search Report and Written Opinion dated May 8, 2023 International Application No. PCT/US22/052440.

*Primary Examiner* — Barry W Taylor

(57) ABSTRACT

A method includes receiving, by an equipment identity register application in the target mobile network, an International Mobile Equipment Identity (IMEI) of a user equipment (UE) associated with the subscriber and a Subscriber Identity Module (SIM) identifier (ID) identifying an inactive SIM card inserted into the UE or an inactive electronic SIM (eSIM) profile installed at the UE, determining that the UE is attempting to attach to the target mobile network for a first time based on the IMEI and the SIM ID, adding an event to an event queue of the target mobile network, and processing the event by accessing subscriber data stored at the source mobile network to validate that the IMEI of the UE is indicated in the subscriber data stored at the source mobile network, wherein the subscriber data includes a subscriber account indicated by the IMEI of the UE.

20 Claims, 7 Drawing Sheets

(56) References Cited

U.S. PATENT DOCUMENTS

2019/0289464 A1\* 9/2019 Loreskar ............... H04L 9/3247
2022/0022014 A1   1/2022 Li et al.
2022/0225103 A1\* 7/2022 Shostak ................. H04W 8/24

\* cited by examiner

EVENT TRIGGERED NETWORK MIGRATION OF SUBSCRIBERS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A subscriber of a first mobile network operator (MNO) may desire to change subscriptions to a second MNO, which may entail migration (e.g., transferring) the subscriber from the first MNO to the second MNO. Similarly, MNOs may occasionally migrate one or more subscribers from another MNO, which may be for various reasons, such as a merger between two or more MNOs, one MNO acquiring another MNO, shutting down a MNO network, creating a new MNO network, etc. Typical subscriber migrations involve a slow and labor-intensive process, which often requires customers to physically interact with a host at a MNO retail store. For example, a customer may need to visit the MNO retail store and interact with the host to activate a Subscription Identity Module (SIM) card or electronic SIM (eSIM) profile for a device, before the customer is considered migrated to the new MNO service. Moreover, the customer may lose text messages and possibly voicemails that were saved on the device when the device changes SIM cards or e-SIM profiles. Therefore, the process of migrating a customer from a previous MNO to a new MNO is time-consuming, error prone, and inconvenient to the subscriber.

SUMMARY

In an embodiment, a method for migrating a subscriber from a source mobile network associated with a source mobile network operator to a target mobile network associated with a target mobile network operator is disclosed. The method includes receiving, by an equipment identity register application in the target mobile network, an International Mobile Equipment Identity (IMEI) of a user equipment (UE) associated with the subscriber and a Subscriber Identity Module (SIM) identifier (ID) identifying a SIM card inserted into the UE or electronic SIM (eSIM) profile installed at the UE, wherein the SIM card or the eSIM profile is inactive, determining, by the equipment identity register application, that the UE having the SIM card or eSIM profile is attempting to attach to the target mobile network for a first time based on the IMEI of the UE and the SIM ID identifying the SIM card or the eSIM profile, adding, by the equipment identity register application, an event to an event queue of the target mobile network, wherein the event indicates the IMEI of the UE and the SIM ID identifying the SIM card or the eSIM profile, and processing, by a network event orchestration manager application in the target mobile network, the event by accessing subscriber data stored at the source mobile network to validate that the IMEI of the UE is indicated in the subscriber data stored at the source mobile network, wherein the subscriber data includes a subscriber account indicated by the IMEI of the UE. When the IMEI of the UE is indicated in the subscriber data, the method includes transmitting, to the UE using the target mobile network API, SIM data to the UE to program the SIM card or the eSIM profile at the UE, wherein the SIM data associates the SIM card or the eSIM profile to the subscriber, and permitting the UE to attach to the target mobile network after activating the SIM card or the eSIM profile and transmitting the SIM data to the UE.

In an embodiment, a method for migrating a subscriber from a source mobile network associated with a source mobile network operator to a target mobile network associated with a target mobile network operator is disclosed. The method includes receiving, by an equipment identity register application in the target mobile network, when a SIM card associated with the subscriber is inserted into a UE, an IMEI of the UE and an IMSI of the SIM card, wherein the SIM card is inactive, determining, by the equipment identity register application, that a combination of the IMEI of the UE and the IMSI of the SIM card has not been previously registered with the target mobile network, adding, by the equipment identity register application, an event to an event queue of the target mobile network when the UE combination of the IMEI of the UE and the IMSI of the SIM card has not been previously registered with the target mobile network, wherein the event comprises the IMEI of the UE, processing, by a network event orchestration manager application in the target mobile network, the event by accessing subscriber data stored at the source mobile network to validate that the IMEI of the UE is indicated in the subscriber data stored at the source mobile network, wherein the subscriber data includes a subscriber account associated with the IMEI of the UE, migrating, by the network event orchestration manager application, the subscriber data at the source mobile network to the target mobile network by authorizing the target mobile network to access the subscriber data stored at the source mobile network to provide network services to the subscriber, without relocating the subscriber data from the source mobile network to the target mobile network, and transmitting, to the UE using a target mobile network API, SIM data and an instruction to activate the SIM card, wherein the SIM data associates the SIM card to the subscriber when the IMEI of the UE is indicated in the subscriber data.

In an embodiment, a system comprising at least one processor, at least one non-transitory memory, and an equipment identity register application is disclosed and a network event orchestration manager application. The equipment identity register application is stored in the at least one non-transitory memory, which when executed by the at least one processor, causes the at least one processor to be configured to determine that a combination of an IMEI of a UE and a SIM ID has not been previously registered with a target mobile network, wherein the SIM ID identifies a SIM card inserted into the UE or eSIM profile installed at the UE, wherein the SIM card or the eSIM profile is inactive, and add an event to an event queue when the combination of the IMEI of the UE and the SIM ID identifying the SIM card or the eSIM profile has not been previously registered with the target mobile network, wherein the event indicates the combination of the UE with the SIM card or eSIM profile. The network event orchestration manager application is stored in the at least one non-transitory memory, which when executed by the at least one processor, causes the at least one processor to be configured to process the event by accessing subscriber data stored at a source mobile network to validate that the IMEI of the UE is indicated in the subscriber data stored at the source mobile network, wherein the subscriber data includes a subscriber account associated with the IMEI of the UE, and transmit, to the UE using a target API, an instruction to activate the SIM card or eSIM profile at the UE, and transmitting, using the target network API, SIM data to the UE to program the SIM card or the eSIM profile at the UE, wherein the SIM data associates the SIM card or the eSIM profile to the subscriber.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
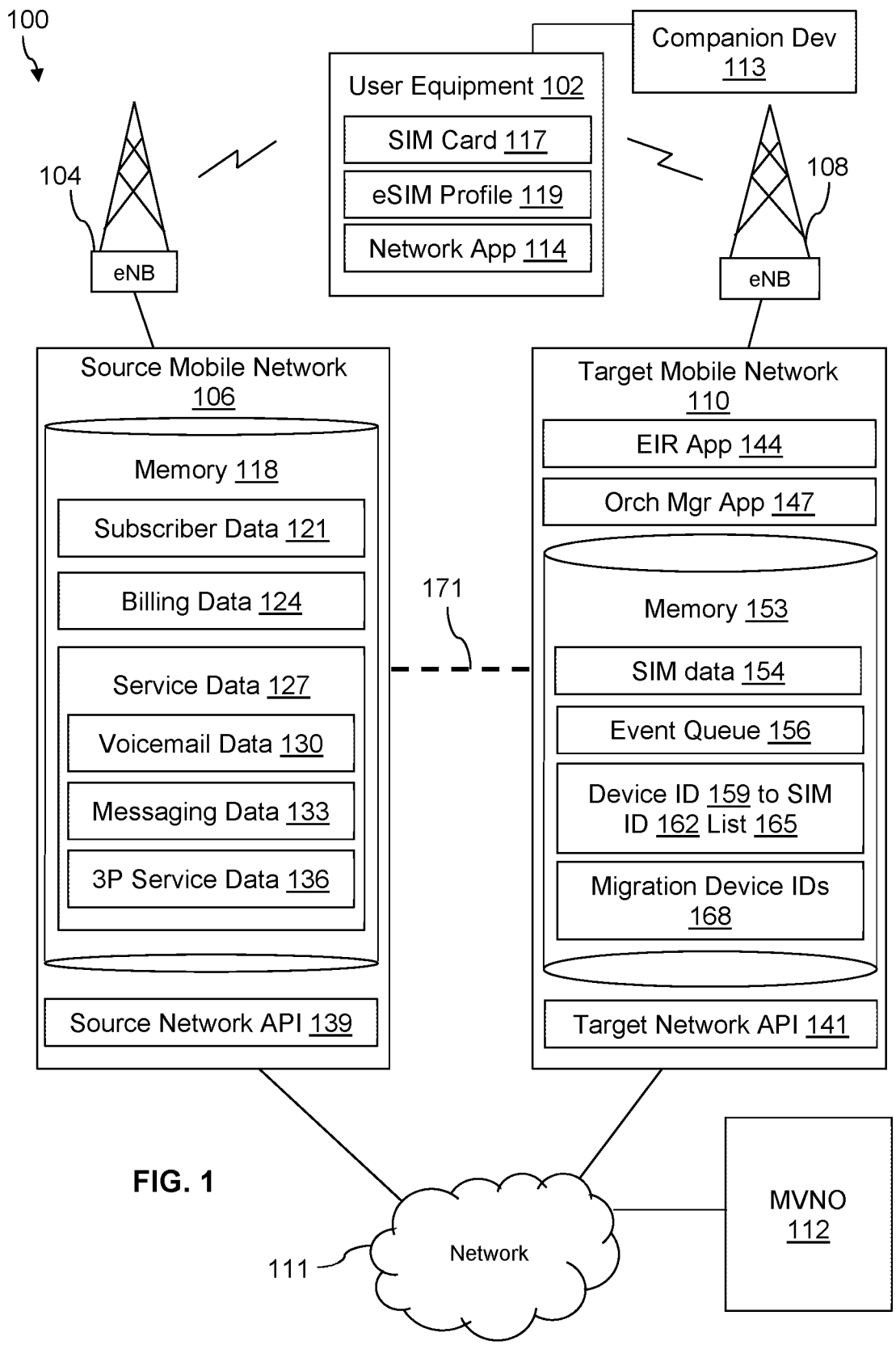
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, a mobile network operator (MNO), also referred to herein as a "carrier," may desire to migrate subscribers or devices from a source carrier, which may be associated with a source mobile network. A mobile network may refer to a network including a radio access network (RAN) and a core network. The RAN may include the access network containing the radio elements of a cell network, and the core network may include the elements that manage the subscriber information, call setup and routing, and related system supports.

In some cases, a target carrier may desire to migrate subscribers from a source carrier when the source carrier and the target carrier merge together to form a single enterprise, or the target carrier acquires the source carrier. Alternatively, subscribers may desire to be migrated between carriers due to other situations, such as the shutting down of mobile networks associated with a carrier or the creation of new carriers and associated mobile networks. In another case, subscribers may need to be migrated between carriers due to partnership changes, such as when a mobile virtual network operation (MVNO) changes partnerships to use the underlying mobile network from one carrier to another.

However, the migration of one or more subscribers to a different carrier, and thus a different mobile network, is typically a labor-intensive and inconvenient process. In most cases, a subscriber may need to visit a retail store and exchange information with a host at the store to activate a physical Subscriber Identity Module (SIM) card or an electronic SIM (eSIM) profile that is compatible with a target carrier and associated mobile network. In other cases, the subscriber may need to place a call with the target carrier's customer care line and exchange information with a host, to activate the physical SIM card or the eSIM profile that is compatible with a target carrier and associated mobile network. Alternatively, the subscriber may need to create a new account at the target carrier website and manually enter information into the website, which may trigger activation of the physical SIM card or the eSIM profile. In addition, the subscriber may also need to manually deactivate any prior SIM cards or eSIM profiles from a previously subscribed for carrier.

In any of these cases, the information exchanged to activate the SIM card or eSIM profile may include private personal identifiable information (PII), such as a mailing address and even a social security number. This PII may need be communicated verbally in person or via telephone, or manually entered through the target carrier website, all of which may not be secure manners of communicating private information. A host at the new carrier may even need to perform a credit check before the subscriber can be activated at the new carrier.

Moreover, the subscriber may lose data saved through various services on the device when the device switches to a new carrier by activating a new SIM card or new eSIM profile. For example, if a device has certain text messages or voicemails saved using a prior carrier service, then when the device switches SIM cards/eSIM profiles to a new carrier service, the device may lose the saved text messages and voicemails. This is because the device may use a new voicemail and text message service associated with the new carrier when switching to the new carrier service. Therefore, if the subscriber desires to keep saved text messages, voicemails, or other third-party data, the subscriber may need to first upload the saved messages, voicemails, or other third-party data to a different data store. If possible, the subscriber may attempt to subsequently download the saved data to the device using the new carrier service. However, often times, this may not even be possible due to incompatibility between different carrier services. Therefore, the process of migrating a subscriber from one carrier to another may be insecure, time consuming, resource intensive, error prone, and highly inconvenient.

The embodiments disclosed herein provide for a scalable, user-transparent, device agnostic migration solution, which is based on real-time events generated when an inactive SIM card is inserted into a customer device or when an inactive eSIM profile is installed at the customer device. The event generation may trigger back-end processes within the target carrier's mobile network to systemically migrate (e.g., transfer or transition) the customer's subscription and related services from a source network to a target network. The source carrier and source mobile network refer to the carrier and associated network with which the subscriber was previously subscribed. The target carrier and target mobile network refer to the carrier and associated network to which the subscriber desires to be migrated.

The embodiments disclosed herein enable the migration of the subscriber to be handled seamlessly in the background, in a manner that is relatively transparent to the subscriber and requires little to no subscriber action. Unlike traditional techniques of subscriber migration that involve manually activating a SIM card and inserting the activated SIM card into the device to initiate migration, the embodiments disclosed herein trigger subscriber migration by the insertion of an inactive SIM card or installation of an inactive eSIM profile. Therefore, the embodiments disclosed herein eliminate the need for a user to visit the retail store or place a call with a carrier to exchange the necessary information for activation of a SIM card or eSIM profile. In addition, the embodiments disclosed herein also eliminate the need for a user to manually deactivate any prior SIM cards or eSIM profiles from a previously subscribed for carrier. Further, private information need not be exchanged over insecure lines of communication, but instead is seamlessly accessed in the background between mobile networks, as further described herein. The embodiments disclosed herein enable the devices that have been migrated to maintain old voicemails, old text messages, and other saved data even after the device switches to the new carrier. Lastly, the subscription migration techniques described herein enable a subscription to be migrated such that devices are capable of attaching to target mobile networks in a customary way, rather than in a "walled garden" restricted access mode.

In one case, a target carrier to which the subscriber is being migrated may physically mail or otherwise provide a SIM card associated with the target carrier to the subscriber. The SIM card provided to the subscriber has an International Mobile Subscriber Identifier (IMSI), but is otherwise inactive, meaning that the SIM card is not yet connected to a subscriber account, phone number, etc. Upon receiving the SIM card, the subscriber may remove a SIM card from a user equipment (UE) that is registered with a source carrier, and insert the SIM card of the target carrier. The insertion of the target carrier SIM card may trigger the UE to attempt to attach to the target mobile network, for example, by sending the IMSI, an International Mobile Equipment Identity (IMEI) of the UE and/or an integrated circuit card identity (ICCID) that identifies the SIM to the target mobile network.

In another case, when the UE is programmed to support eSIM profiles, the target carrier may allocate and transmit an eSIM profile associated with the target carrier to the UE. The eSIM profile provided to the subscriber UE may have an identifier, such as, for example, a IMEI and/or an IMSI, but is also otherwise inactive. The subscriber may receive a message with instructions regarding completion of an over-the-air (OTA) eSIM profile installation. Completion of the OTA eSIM profile installation may trigger the UE to attempt to attach to the target mobile network, for example, by sending the IMSI and/or IMEI of the UE to the target mobile network. As used herein, the term "SIM ID" may refer to the IMSI identifying the SIM card and/or the eSIM profile.

In an embodiment, an equipment identity register (EIR) of the target mobile network may receive the SIM ID and the IMEI from the UE to determine whether the UE has access to the target mobile network based on whether the combination of the SIM ID and the IMEI are previously registered with the target mobile network. When the combination of the SIM ID and the IMEI are not previously registered with the target mobile network, the EIR may determine that the UE in combination with the particular SIM card or eSIM profile has not previously attempted to attach to the target mobile network. In other words, the EIR may determine that this is the first time that the combination of the UE with the SIM card or eSIM profile is attempting to attach to the target mobile network. Upon making this determination, the EIR may add an event, to an event queue of the target mobile network, indicating that this is the first time that the combination of the UE with the SIM card or eSIM profile is attempting to attach to the mobile network. The event may comprise the SIM ID and the IMEI of the UE.

A network event orchestration manager (also referred to herein as an "orchestration manager") of the target mobile network may obtain the event from the event queue in a first-in first-out manner to process the event. In an embodiment, the target mobile network may maintain a list of IMEIs identifying UEs that are to be migrated from the source mobile network to the target mobile network. The orchestration manager may traverse this list to verify that the IMEI of the UE obtained from the event is included in the list. If so, the orchestration manager may access a subscriber database in the source mobile network via, for example, a secure connection between the source mobile network and the target mobile network, or via one or more application programming interface (API) calls to the source mobile network. While accessing the subscriber database, the orchestration manager may confirm that the IMEI of the UE is indicated in a subscriber account of the source carrier. This may validate that the subscriber behind the UE was previously a subscriber of the source carrier.

The orchestration manager may then trigger the process for migrating the subscription and related services to the target mobile network. This process may involve the orchestration manager transmitting an instruction to the UE to activate the SIM card or eSIM profile of the target mobile network. The orchestration manager may also transmit other SIM data, such as a phone number connected to the subscriber, to ensure that the SIM card or eSIM profile is linked to the subscriber account. In an embodiment, the migration of the cellular services to the target mobile network may also include the migration of the subscriber profile and service feature details from a subscriber database of the source mobile network to a subscriber database of the target mobile network. Upon activating the SIM card or eSIM profile of the target carrier, the UE may be permitted full access to the target mobile network.

In an embodiment, the "migration" of the subscriber to the target mobile network is performed in a cross-provisioning manner, in which the subscriber data of the subscriber may actually be physically transferred from the source mobile network to the target mobile network. In an embodiment, the target mobile network may physically provision the subscriber and service details to the target network subscriber database, and de-provision the same subscriber details from the source mobile network. For example, the EIR may access and copy the subscriber and service details from the subscriber database at the source mobile network, and then store the subscriber and service details at the subscriber database of the target mobile network. Once the subscriber and service details have been verified and stored at the target mobile network, the EIR may also access the subscriber database at the source mobile network to delete the subscriber and service details from the source mobile network.

In another embodiment, the "migration" of the subscriber to the target mobile network is performed by the mobile networks as a multiple operator core network architecture (MOCN). In this case, the subscriber data is not actually moved from the source mobile network to the target mobile network. Instead, the target mobile network may use the subscriber data stored at the source mobile network via, for example, a secure connection between the mobile networks or API calls, when providing network services to the subscriber. For example, the target mobile network may determine a subscribed for quality of service associated with the UE by accessing the subscriber data at the source mobile network in a secure manner, and then providing that quality of service using network resources at the target mobile network.

Thus, the MOCN architecture manner of migration heavily reduces the load on the network that would otherwise be used to physically migrate the subscriber data from the source mobile network to the target mobile network. In addition, the use of the event queue to sequentially process the migration of subscribers ensures that the mobile network does not become overloaded due to a bulk migration of a considerably large number of subscribers.

In some embodiments, the orchestration manager may determine one or more services provided by the source carrier that may be migrated to the target carrier. For example, the services may include voicemail services, messaging services, and/or third-party application services (e.g., streaming content application services, electronic commerce application services, etc.). The orchestration manager may determine the services for migration based on, for example, a policy of the subscriber at the source carrier or a default policy indicating that one or more services should always be migrated (e.g., text messages and voicemails should be migrated by default). The orchestration manager may then determine a target service provided by the target carrier that matches the to be migrated service from the source carrier. The orchestration manager may instantiate the target service as an active service for the subscriber at the target mobile network. In some embodiments, the migration of the service data may be performed in a cross-provisioning manner or in the MOCN architecture manner, as described above.

As an illustrative example, the service being migrated may be a voicemail service. The migration of the voicemail service ensures that the voicemail of the subscriber that was previously saved at the UE under the source carrier voicemail service remains saved at the UE, but under the target carrier voicemail service. As another example, the service being migrated may be a billing service. The migration of the billing service ensures that the bills may continue to be received by the subscriber based on the same subscription plan, billing address, and payment plan, but under the target carrier billing service.

In an embodiment, the target mobile network may include multiple event queues, each related to a different migration from a different source mobile network associated with different carriers. The EIR may determine the event queue in which to place an event based on at least one of the IMEI of the UE and SIM ID. For example, the target mobile network may maintain a list of IMEIs and the associated source carrier. The EIR may use this list to allocate events accordingly into the separate event queues. As another example, the EIR may be pre-configured with data indicating that particular SIM ID ranges correspond to different source carriers, and the EIR may use these SIM ID ranges to allocate events accordingly into the separate event queues. In an embodiment, the orchestration manager may process events from different queues simultaneously in parallel, using the techniques disclosed herein, to most efficiently migrate subscribers to the target carrier.

In some cases, the UE may be closely associated with one or more companion devices. For example, when the UE is a mobile phone, a companion device of the UE may be a smart watch. The mobile phone and the smart watch may be considered companion devices because the two devices receive substantially similar notifications and are linked by, for example, the same phone number such that both devices ring upon receiving a call.

In an embodiment, the companion device may be indicated in the subscriber data in the source mobile network, which is accessed by the orchestration manager. The orchestration manager may send the companion device an eSIM profile of the target carrier and corresponding activation instructions in parallel to activating the SIM card or eSIM profile of the target carrier at the UE. In this way, companion devices may be automatically migrated to the target carrier without any user interaction from the subscriber.

In some embodiments, the migration techniques disclosed herein may be used when a MVNO changes partnerships from a first carrier to a second carrier. A MVNO is a wireless communications service provider that does not own the underlying mobile network over which it provides services to customers. For example, MVNO-A may previously have had a partnership agreement with carrier-A to use the mobile network of carrier-A. However, MVNO-A may cancel the agreement with carrier-A, and instead enter into an agreement with carrier-B to use the underlying mobile network of carrier-B. In this case, there are three business enterprises or entities involved with the migration, namely, the MVNO-A, the source carrier (carrier-A), and the target carrier (carrier-B).

The migration process may still be triggered based on the insertion of the inactive SIM card or the installation of the inactive eSIM profile, when a subscriber desires to change carrier services. When processing the event from the event queue, the orchestration manager may also access a subscriber database of the MVNO via, for example, a secure channel between the MVNO and the target mobile network, or via API calls. The orchestration manager may similarly determine whether the IMEI of the UE is included in a subscription account in the subscriber database of the MVNO. If so, then the orchestration manager may gather the subscription data and service data from the subscriber database of the MVNO and migrate the subscription data and service data to the target mobile network. This MVNO service migration may also be performed in a cross-provisioning manner or in the MOCN architecture manner, as described above.

Accordingly, the embodiments disclosed herein migrate subscribers in a seamless and organized manner using one or more event queues, all triggered by the insertion of an inactive SIM card or installation of an inactive eSIM profile. This in turn prevents the mobile network from being overloaded when migrating a large number of subscribers. In addition, the MOCN architecture manner of migrating subscribers and services, as mentioned above, is far more resource and cost efficient since the data does not actually need to be moved through the mobile network to migrate the subscribers.

Turning now to FIG. 1, a system 100 is described. In an embodiment, the system 100 comprises a UE 102, a cell site 104 and corresponding source mobile network 106, a cell site 108 and corresponding target mobile network 110, network 111, a companion device 113, and an MVNO 112. The cell site 104 and source mobile network 106 may correspond to a source carrier, while the cell site 108 and target mobile network 110 may correspond to a target carrier, different from the source carrier. In other words, the source carrier may own and operate the resources in the source mobile network 106, and the target carrier may own and operate the resources in the target mobile network 110. For example, cell site 104 and the source mobile network 106 may be associated with carrier-A, while cell site 108 and the target mobile network may be associated with carrier-B.

One or more of the cell sites 104 and 108 and mobile networks 106 and 110, respectively, may provide the UE 102 and the companion device 113 with a wireless communication link to the network 111 and MVNO 112 according to a 5G, a long term evolution (LTE), a code division multiple access (CDMA), or a global system for mobile communications (GSM) wireless telecommunication protocol. In this way, the UE 102 and the companion device 113 may be communicatively coupled to the network 111, or the Internet, via the cell sites 104 and 108 and mobile networks 106 and 110, respectively. While the mobile networks 106 and 110 are shown separate from the network 111 in FIG. 1 to better illustrate the difference between the source mobile network 106 and the target mobile network 110, the mobile networks 106 and 110 may equally be thought of as part of the network 111.

The UE 102 and the companion device 113 may each be a cell phone, a mobile phone, a smart phone, a personal digital assistant (PDA), an Internet of things (IoT) device, a wearable computer, a headset computer, a laptop computer, a tablet computer, a notebook computer, a medical monitoring device, a vehicle computer, etc. The UE 102 may include a network application 114, used to attach the UE 102 to the source mobile network 106 via the cell site 104, or attach the UE 102 to the target mobile network 110 via the cell site 108. The UE 102 may also include one or more SIM cards 117, which may be inserted into one or more SIM trays or SIM slots of the UE 102. A SIM card 117 is an integrated circuit running a card operating system (COS) that is intended to securely store the IMSI uniquely identifying the SIM card 117. When the SIM card 117 is activated, the SIM card 117 may store a key, which may be used to identify and authenticate a subscriber behind the UE 102.

The UE 102 may also include one or more eSIM profiles 119, each of which may be stored in an embedded universal integrated circuit card (eUICC) (not shown) of the UE 102 upon installation of the eSIM profiles 119. An eSIM profile 119, when activated, may comprise any one of an IMSI and/or ICCID uniquely identifying the eSIM profile 119, network identity (e.g., a public land mobile network (PLMN) identity), a country code, one or more network access keys, one or more network access credentials, one or more encryption keys, one or more preferred roaming lists (PRLs), one or more access point names (APNs), one or more application service keys.

The source mobile network 106 may be a carrier mobile network owned and operated by a source carrier, which refers to a carrier to which the subscriber behind the UE 102 was subscribed to at a prior time. The target mobile network 110 may refer to a carrier mobile network owned and operated by a target carrier, and the subscriber may intend to transfer the subscription from the source carrier to the target carrier. As such, the subscriber may desire to migrate subscription and service details from the source mobile network 106 to the target mobile network 110. The source mobile network 106 may include a source network API 139, which may be an API used to securely communicate with the UE 102, the companion device 113, the target mobile network 110, the MVNO 112, and any other entity in the system 100.

The source mobile network 106 may include one or more databases stored across one or more memories 118. The memories 118 may store subscriber data 121, billing data 124, and service data 127. In an embodiment, the source mobile network may have separate databases for the subscriber data 121, billing data 124, and service data 127, such as, a subscriber database (or subscription profile repository), billing database, and service database, respectively. The subscriber data 121 may include data regarding one or more subscriber accounts that are previously or currently subscribed with the source carrier. For example, the subscriber data 121 may include the IMEIs for one or more devices linked to each subscription account, IMSIs or ICCIDs for one or more SIM cards 117 or eSIM profiles 119 linked to each subscription account, subscription plans associated with each subscription account, identification information of a subscriber, etc. The billing data 124 may include billing related information, such as, for example, payment details, billing address, payment plans, etc. While the billing data 124 is shown as part of the source mobile network 106, the billing data 124, or at least a portion of the billing data 124, may be a separate component external to the core network of the source mobile network 106. The billing data 124 may include one or more billing components, such as, for example, a source or target billing platform. One or more of these platforms may be positioned external to the source mobile network 106. The service data 127 includes data related to various services offered by and through the source mobile network 106, such as, for example, voicemail services, messaging services, and third-party application services. In this way, the service data 127 may include voicemail data 130, messaging data 133, and third-party application service data 136 (shown in FIG. 1 as "3P service data 136"). The voicemail data 130 may include information regarding voicemails that have been received and saved by the subscriber at the UE 102. The messaging data 133 may include information regarding the messages (text messages or multimedia messages) that have been received and saved by the subscriber at the UE 102. The third-party application service data 136 may include, for example, media content that is saved by the subscriber at the UE 102. The source mobile network 106 may include other data and applications not shown and described in FIG. 1.

The target mobile network 110 includes a target network API 141, which may be an API used to securely communicate with the UE 102, the companion device 113, the source mobile network 106, the MVNO 112, and any other entity in the system 100. The target mobile network 110 may also include one or more databases stored across one or more memories 153. The one or more memories 153 may store the SIM data 154, the event queue 156, a list 165, and migration device IDs 168. The SIM data 145 may include, for example, a Mobile Subscriber Integrated Services Digital Network Number (MSISDN) identifying the subscriber, a phone number linked to the subscriber account, network access keys and/or network access credentials, branding information, applications, and other data artifacts. The list 165 includes combinations of device IDs 159 to SIM IDs 162 identifying devices and SIM cards 117 or eSIM profiles 119 that have previously registered with the target carrier. The migration device IDs 168 may be a list identifying devices that are registered with the source carrier that should be migrated to the target carrier. The target mobile network 110 may also include an EIR application 144 and an orchestration manager application 147 (shown in FIG. 1 as the "Orch Mgr App 147). The target mobile network 110 may include other data and applications not shown and described in FIG. 1. Each of the applications may be executed on one or more computing devices, which may be part of the target mobile network 110 or separate but coupled to the target mobile network 110.

The EIR application 144 may be a software-based application executed in the EIR of the core network in the target mobile network 110, or may be a newly created software application added to the target mobile network 110. When the network application 114 of the UE 102 attempts to attach to the target mobile network 110, the EIR application 144 may receive a device ID 159 of the UE 102 and a SIM ID 162. The device ID 159 of the UE 102 may be an IMEI of the UE 102. The SIM ID 162 may be an identifier of the inactive SIM card 117 inserted into the UE 102 or the inactive eSIM profile 119 installed at the UE 102. The EIR application 144 may use the list 165 to determine whether the UE 102 has access to the target mobile network 110 based on whether the combination of the device ID 159 and the SIM ID 162 have been previously registered with the target mobile network 110. The EIR application 144 may then add an event, to an event queue 156 of the target mobile network 110, indicating that this is the first time that the combination of the UE with the SIM card 117 or eSIM profile 119 is attempting to attach to the target mobile network 110. The event added to the event queue 156 may comprise the device ID 159 and the SIM ID 162. For example, the EIR application 144 may send a message to an event manager of the target mobile network 110, with the device ID 159 and the SIM ID 162, and the event manager may add the event to the event queue 156.

The orchestration manager application 147 may be a software-based application executed in an orchestration manager platform of the target mobile network 110, or may be a newly created software application added to the target mobile network 110. In an embodiment, the orchestration manager application 147 may determine whether the device ID 159 is included in the migration device IDs 168. If so, the orchestration manager application 147 may access the subscriber data 121 in the source mobile network 106, using the target mobile network API 151 or a secure connection 171 established between the source mobile network 106 and the target mobile network 110. In an embodiment, the secure connection 171 may be logical such that the actual communication between the source mobile network 106 and the target mobile network 110 may pass via network 111.

The orchestration manager application 147 may access the subscriber data 121 stored at the source mobile network 106 in a variety of different ways, and as such, is not limited herein. For example, the orchestration manager application 147 of the target mobile network 110 may communicate with, for example, a billing platform of the source mobile network 106 using a defined set of interfaces, or secure APIs. In an embodiment, the secure APIs may include Extensible Markup Language (XML) or JAVSCRIPT object notation (JSON) request and response structures for accessing the subscriber data 121 at the source mobile network 106. In another embodiment, the orchestration manager application 147 may use a lightweight directory access protocol (LDAP) lookup in the subscriber data 121 of the source mobile network 106. In yet another embodiment, the orchestration manager application 147 may directly access the subscriber data 121 in the source mobile network 106 using Structured Query Language (SQL) calls when both the target mobile network 110 and the source mobile network 106 are in a trusted environment allowing such direct access. The orchestration manager application 147 may use the device ID of the UE 102 attempting to access the target mobile network 110 for the first time, to obtain subscription and service related information from the billing platform of the source mobile network 106. While accessing the subscriber data 121, the orchestration manager application 147 may confirm that the device ID 159 is indicated as a device ID of a UE in a subscriber account of the source carrier, validating that the subscriber behind the UE 102 was previously subscribed to the source carrier and should be migrated to the target carrier.

After the orchestration manager application 147 validates that the subscriber behind the UE 102 was previously subscribed to the source carrier and should be migrated to the target carrier, the orchestration manager application 147 may execute the process for migrating the subscription and related services to the target mobile network 110. The orchestration manager application 147 may transmit an instruction to the UE 102 to activate the SIM card 117 or the eSIM profile 119, and transmit SIM data 154 to the UE 102 to link the SIM card 117 or the eSIM profile 119 to the subscriber. The orchestration manager application 147 may also access the service data 127 and/or billing data 124 that may also be migrated to the target mobile network 110 for the subscriber.

In one embodiment, the orchestration manager application 147 may migrate the subscriber data 121, billing data 124, and service data 127 for the subscriber using the cross-provisioning technique, in which the data is physically provisioned at the target mobile network 110 and de-provisioned from the source mobile network 106. In this embodiment, the orchestration manager application 147 physically relocates at least a portion of the subscriber data 121, billing data 124, and service data 127 from the source mobile network 106 to the one or more memories 153 of the target mobile network 110. In another embodiment, the orchestration manager application 147 may migrate the subscriber data 121, billing data 124, and service data 127 for the subscriber using the MOCN architecture manner. In this case, the orchestration manager application 147 provides network services and other services to the subscriber using the target mobile network 110 by accessing the data stored at the source mobile network 106, using API calls from the target mobile network API 141, or using the secure connection 171.

In an embodiment, the companion device 113 may be a device that receives similar notifications and is otherwise closely linked to the UE 102. The orchestration manager application 147 may also send the companion device 113 an eSIM profile 119 of the target carrier and corresponding activation instructions in parallel to activating the SIM card 117 or eSIM profile 119 of the target carrier at the UE 102. The subscriber data 121, billing data 124, and/or service data 127 of companion device 113 may be migrated to the target mobile network 110 in a manner similar to that described above (e.g., either using the cross-provisioning manner or by MOCN architecture manner). The orchestration manager application 147 may then communicate with a billing platform of the source carrier to deactivate the subscriber, the UE 102, and/or companion device 113 from the source carrier and source mobile network 106.

In an embodiment, an MVNO 112 may switch partnerships from the source carrier to the target mobile network, in which case the subscribers from the source mobile network 106 may be migrated to the target mobile network 110. After the EIR application 144 adds the event to the event queue 156 and the orchestration manager application 147 begins processing the event, the orchestration manager application 147 may access a subscriber database of the MVNO 112. The orchestration manager application 147 may access the subscriber database, via API calls or a secure channel, to determine whether the device ID 159 is included in subscriber data of the MVNO 112. If so, the orchestration manager application 147 may gather the subscription data and service data from the subscriber database of the MVNO 112.

In an embodiment, the orchestration manager application 147 may create a new subscription account for the subscriber with the MVNO 112 at the target mobile network 110 using the gathered subscription data and service data. For example, the new subscription account may be created by registering the UE 102 with the MVNO 112 and adding subscription data to a subscription database in the target mobile network 110. In this embodiment, the MVNO 112 may allocate resources and provide services to the UE 102 using the subscription account stored at the target mobile network 110. In another embodiment, the orchestration manager may access the subscription data at the source mobile network 106 to allocate resources and provide services to the UE 102 using the target mobile network 110. The MVNO 112 may be notified of the migration, such that services can be disassociated from the source mobile network 106 as necessary, and such that the billing services may be updated according to the migration.

Figure 2:
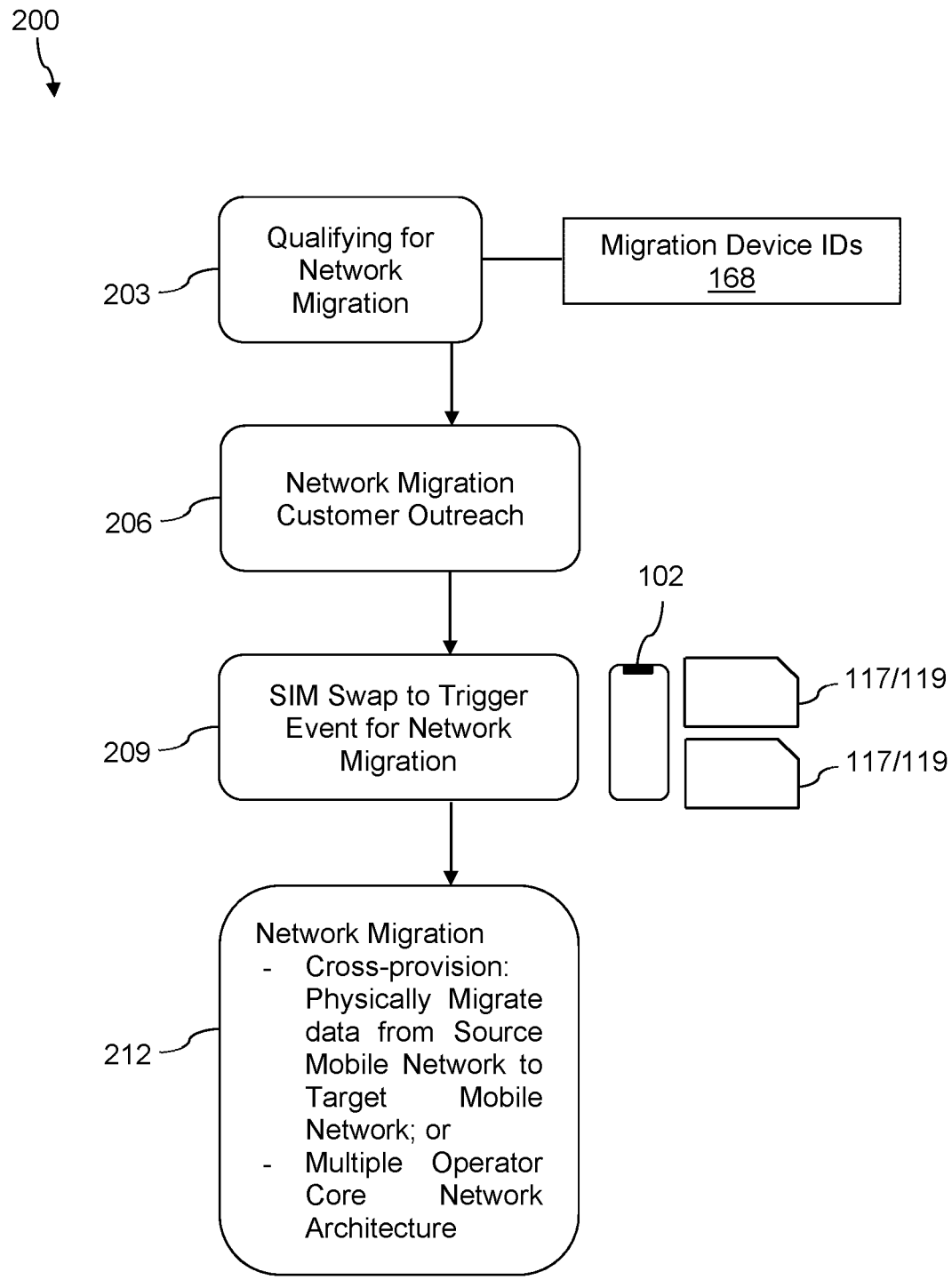
FIG. 2 is a flowchart of a first method performed at least in part by the communication system of FIG. 1 according to an embodiment of the disclosure.

Turning now to FIG. 2, a method 200 is described. Method 200 may be performed before the UE 102 inserts an inactive SIM card 117 or installs an inactive eSIM profile 119, which triggers the back-end migration process. At step 203, an operator of the target mobile network 110 may use a computing device, or an application executing at the computing device, to determine subscribers and/or associated UEs 102 that qualify to be migrated from the source carrier to the target carrier. This determination may be performed based on various criteria, such as, for example, geographic location of the subscriber and/or UE 102, network coverage of the UE 102, UE 102 compatibility with the target mobile network 110, account status of the subscriber, and subscription plan compatibility. The subscribers and/or associated UEs 102 that are eligible to be migrated from the source carrier to the target carrier may be indicated in the migration device IDs 168 maintained at the target mobile network 110. For example, the migration device IDs 168 may indicate IMEIs of UEs 102 corresponding to one or more subscribers of the source carrier, which are eligible to be migrated from the source carrier to the target carrier.

At step 206, an operator of the target mobile network 110 may use the computing device, or the application executing at the computing device, to define an outreach strategy for the selected subscribers that are eligible to be migrated from the source carrier to the target carrier. For example, the outreach strategy may involve sending a message (mail, electronic message (e-mail), text message, multimedia message, etc.) to the subscriber indicating that one or more UEs 102 of the subscriber is eligible to be migrated from the source carrier to the target carrier according to the embodiments disclosed herein. The subscribers may physically receive an inactive SIM card 117 that, while being associated with the target carrier, is inactive in the sense that the SIM card 117 is not yet associated with the subscriber.

When the subscriber device is compatible with eSIM profiles 119, a computing device or application running at the target mobile network 110 may allocate and release an eSIM profile 119 to the UE 102, which is queued for OTA delivery to the UE 102. In this case, the subscriber may receive a message with instructions regarding completion of the OTA eSIM profile installation. The OTA eSIM profile installation process may involve at least one of: an activation code based eSIM delivery mechanism with a quick response (QR) code for scanning, a direct subscription manager data preparation (SMDP+) eSIM profile 119 delivery mechanism in which the UE 102 may have a configuration pointing directly to the target carrier's SMDP+ platform fully qualified domain name (FDQN) address, a discovery server based eSIM profile 119 delivery mechanism in which the UE 102 may perform a real-time check for an available eSIM profile 119 with an industry or original equipment manufacturer (OEM) discovery server, etc. The subscriber may complete the OTA eSIM profile 119 installation procedure according to any of the foregoing processes to enable the eSIM profile 119. However, at this stage, the eSIM profile 119 is still inactive since the eSIM profile 119 is not yet associated with the subscriber.

At step 209, the subscriber performs a SIM swap, which involves either removing a previous SIM card from the UE 102 and inserting the SIM card 117 received from the target mobile network 110, or selecting to enable the eSIM profile 119. Upon performing the SIM swap, the UE 102 attempts to attach to the target mobile network 110 by sending a message comprising the device ID 159 and the SIM ID 162 to the cell site 108. The cell site 108 may forward the device ID 159 and the SIM ID 162 to the EIR application 144.

The EIR application 144 may recognize that this is the first time that the combination of the UE 102 with the SIM card 117 or eSIM profile 119 is attempting to attach to the target mobile network 110, by determining that the combination of both the device ID 159 and the SIM ID 162 is not present in the list 165. As mentioned above, the list 165 may include combinations of device IDs 159 and the SIM IDs 162 that are registered with the target carrier and permitted full access to the target mobile network 110. The EIR application 144 may determine that this is the first time that the UE 102 is attempting to attach to the target mobile network 110. Alternatively, the EIR application 144 may determine that this may not be the first time that UE 102 is attempting to attach to the target mobile network 110, but that this is the first time that the UE 102, using the SIM card 117 or eSIM profile 119, is attempting to attach to the target mobile network 110. The EIR application 144 may then add an event to the event queue 156 based on the combination of both the device ID 159 and the SIM ID 162.

At step 212, the orchestration manager application 147 may obtain the event from the event queue 156, to begin processing the event and migrate the subscriber from the source carrier to the target carrier based on whether certain conditions are met. The orchestration manager application 147 may determine whether the device ID 159 is included in the migration device IDs 168 determined at step 203. The orchestration manager application 147 may then access at least a portion of the subscriber data 121 to determine whether the device ID 159 obtained from the event is included in a subscriber account of the source carrier. For example, the orchestration manager application 147 may communicate with the source mobile network 106 via the secure connection 171 to access the subscriber data 121, billing data 124, and/or service data 127. Alternatively, the target mobile network 110 may communicate with the source mobile network 106 using the target mobile network API 141 and the source mobile network API 139 to access the subscriber data 121, billing data 124, and/or service data 127, using the various methods described above. If the device ID 159 obtained from the event is included in a subscriber account of the source carrier, then the orchestration manager application 147 may begin migration of at least a portion of the subscriber data 121, billing data 124, and/or service data 127 to the target mobile network 110.

As used herein, "migration" may refer to the cross-provisioning technique of migration discussed above in which the data is physically relocated from the source mobile network 106 to the target mobile network 110, and removed from the source mobile network 110 after verification of migration to the target mobile network 110. In another embodiment, as described above, "migration" may refer to the MOCN architecture manner. In this manner, the data is retained at the source mobile network 106 instead of being physically relocated to the target mobile network 110. In this case, the target mobile network 110 may be authorized and permitted access to the data at the source mobile network 106 to provide network services and other services to the subscriber using the target mobile network.

Once the subscriber has been migrated, the orchestration manager application 147 may transmit instructions to the UE 102 to activate the SIM card 117 or eSIM profile 119 and transmit SIM data 145 to the UE 102 to link the SIM card 117 or eSIM profile 119 to the subscriber. Once activated and linked, the UE 102 may use SIM card 117 or eSIM profile 119 to exchange network credentials or keys with the cell site 108, which may then permit the UE 102 to have full access to the target mobile network 110 in the customary manner (as opposed to the "walled garden" restricted access mode). The orchestration manager application 147 may also transmit a message to a billing platform in the source mobile network 106 instructing the source mobile network 106 to deactivate the subscriber. The NOEM application 147 may transmit a message to the UE 102 to remove the SIM card of the source carrier or deactivate the eSIM profile of the source carrier. In this way, the UE 102 may no longer be permitted to access network 111 using the source mobile network 106.

In an embodiment, the target mobile network 110 may notify the UE 102, for example, via text message, voice message, or e-mail, that the migration of the subscriber from the source carrier to the target carrier is complete. In addition, the target mobile network 110 may add the device ID 159 and SIM ID 162 combination in the list 165, indicating that the UE 102 in combination with the SIM card 117 or e-SIM profile 119 are registered with the target mobile network 110. In an embodiment, the entries in the list 165 associated with UEs 102 that have been migrated to the target mobile network 110 may be flagged to include a bit or ID, for example, signifying that the data associated with the subscriber behind the respective UE 102 is still stored at the source mobile network 106. The bit or ID may indicate that the particular subscriber has been migrated to the target mobile network 110 in either the cross-provisioning manner or the MOCN architecture manner. In this way, when the UE 102 attaches to the target mobile network 110, the target mobile network 110 may recognize that network services and other related services are to be provide to the UE 102 using the network resources in the target mobile network 110, by accessing data stored in the source mobile network 106.

The orchestration manager application 147 may also access and migrate the billing data 124 or service data 127, which may be used to provide similar services to the UE 102 using resources at the target mobile network 110. In an embodiment, the orchestration manager application 147 may determine a source service (e.g., billing service, voicemail service, messaging service, etc.) provided by the source carrier that is to be migrated from the source carrier to the target carrier. The orchestration manager application 147 may determine a target service that matches the source service, except that the target service is provided by the target carrier through the target mobile network 110. The target mobile network 110 may physically store the billing data 124 and the service data 127 at the memory 153 of the target mobile network 110, and access the memory 153 to provide this target service to the UE 102 using resources at the target mobile network 110 (e.g., using the cross-provisioning manner). The target mobile network 110 may alternatively provide this target service to the UE 102 using resources at the target mobile network 110 by accessing the billing data 124 or service data 127 at the source mobile network 106 (e.g., using the MOCN architecture manner).

For example, the orchestration manager application 147 may migrate the billing data 124 to the target mobile network 110, such that when the UE 102 is granted full access to the target mobile network 110, the subscriber continues to receive similar bills to the same address and according to a similar subscription plan. However, the bills may be presented to the user in a format that is more consistent with the target carrier. Similarly, the orchestration manager application 147 may migrate the voicemail data 130, such that when the UE 102 is granted full access to the target mobile network 110, the voicemail data 130 is retained at the UE 102, but presented to the user in a format that is compatible with the target carrier. In addition, the orchestration manager application 147 may migrate the third-party service application data 136, such that when the UE 102 is granted full access to the target mobile network 110, the third-party service application data 136 is retained at the UE 102, but presented to the user in a format and using an application that is compatible with the target carrier.

Figure 3:
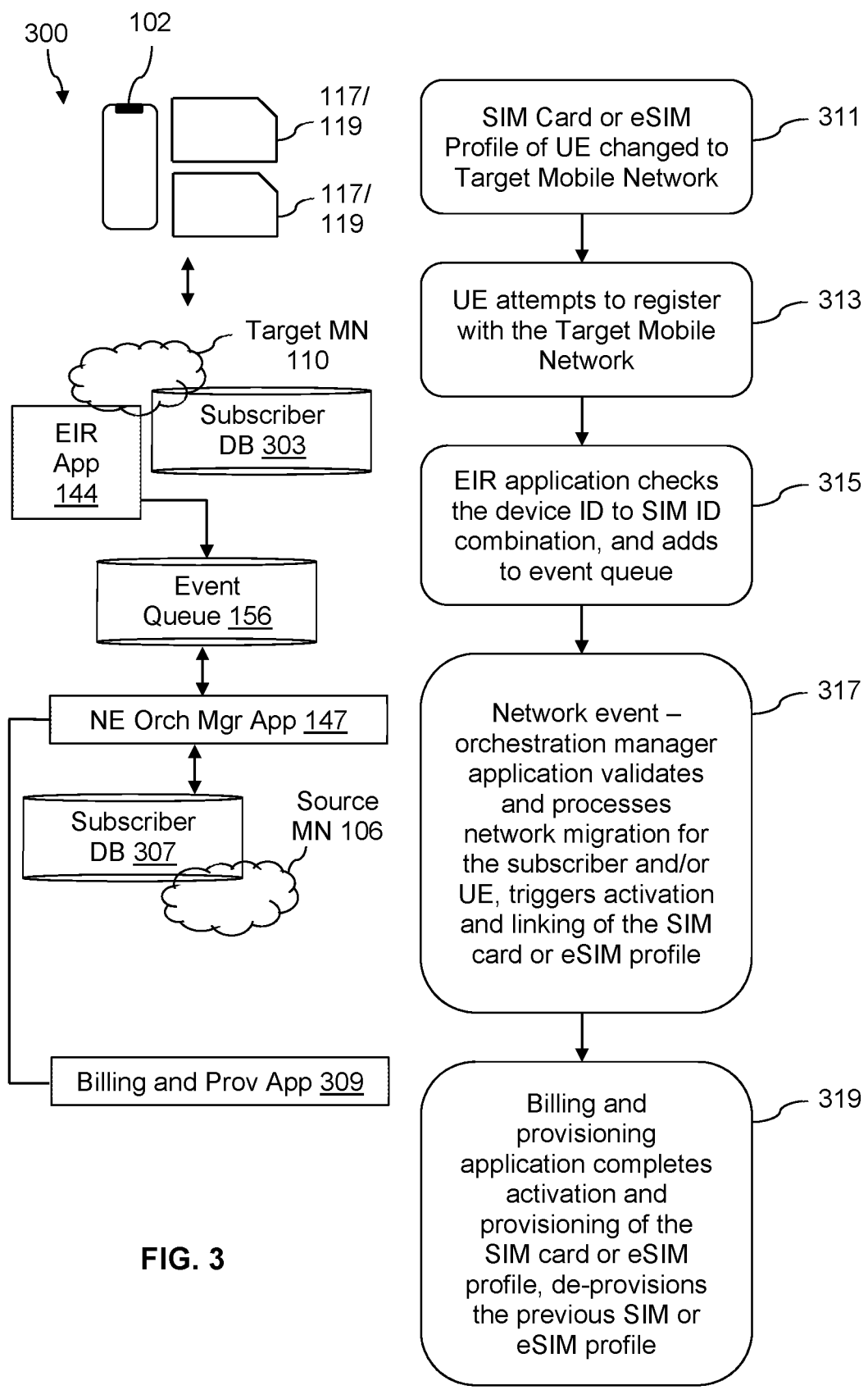
FIG. 3 is a flowchart of a second method performed by the communication system of FIG. 1 according to an embodiment of the disclosure.

Turning now to FIG. 3, a method 300 is described. Method 300 may be performed after a subscriber receives an inactive SIM card 117 and corresponding instructions to enable the SIM card 117 to be activated, or after the subscriber receives instructions to perform an OTA installation of an inactive eSIM profile 119 allocated for the subscriber. At step 311, the subscriber performs a SIM swap, similar to step 209 of method 200. The subscriber either removes a previous SIM card from the UE 102 and inserts the SIM card 117 received from the target mobile network 110, or installs the eSIM profile 119, which enables the eSIM profile 119 to be activated.

At step 313, the UE 102, for example, the network application 114, may attempt to register or attach to the target mobile network 110. Upon performing the SIM swap, the UE 102 attempts to attach to the target mobile network 110 by sending a message comprising the device ID 159 and the SIM ID 162 to the cell site 108. The cell site 108 may forward the device ID 159 and the SIM ID 162 to the EIR application 144. For example, the message may be routed through a core network mobility management entity (MME), which then may perform network authentication procedures. The network authentication procedures may include the transaction, of the UE 102 attempting to attach to the target mobile network 110, being sent to the EIR application 144.

At step 315, the EIR application 144 may use the list 165 to determine whether the combination of the UE 102 with the SIM card 117 or eSIM profile 119 has been previously registered or attached to the target mobile network 110. If not, the EIR application 144 may then add an event to the event queue 156 based on the combination of both the device ID 159 and the SIM ID 162. In an embodiment, the list 165 may be associated with the subscriber database 303, which includes subscriber information regarding subscribers of the target carrier associated with the target mobile network 110.

At step 317, the orchestration manager application 147 obtains the event from the event queue, and first determines whether the device ID 159 is included in the migration device IDs 168. If so, orchestration manager application 147 may then access at least a portion of the subscriber data 121 in a subscriber database 307 of the target mobile network 110, to determine whether the device ID 159 obtained from the event is included in a subscriber account of the source carrier. If so, then the orchestration manager application 147 may begin migration of at least a portion of the subscriber data 121, billing data 124, and/or service data 127 to the target mobile network 110.

At step 319, a billing and provisioning application 309 of the target mobile network 110 may complete activation of the SIM card 117 or eSIM profile 119 by transmitting an instruction and the SIM data 154 to the UE 102. The UE 102 may use the instruction to activate the SIM card 117 or eSIM profile 119. The UE 102 may use the SIM data 154 to link the SIM card 117 or eSIM profile 119 to the subscriber by, for example, saving the SIM data 154 to the SIM card 117 or eSIM profile 119. The UE 102 may use the SIM data 154 to authenticate with the cell site 108 and access the target mobile network 110. The billing and provisioning application 309 may also de-provision the previous SIM card or eSIM profile associated with the source carrier, for example, by transmitting a message with an instruction for de-provisioning to the source mobile network 106.

Figure 4:
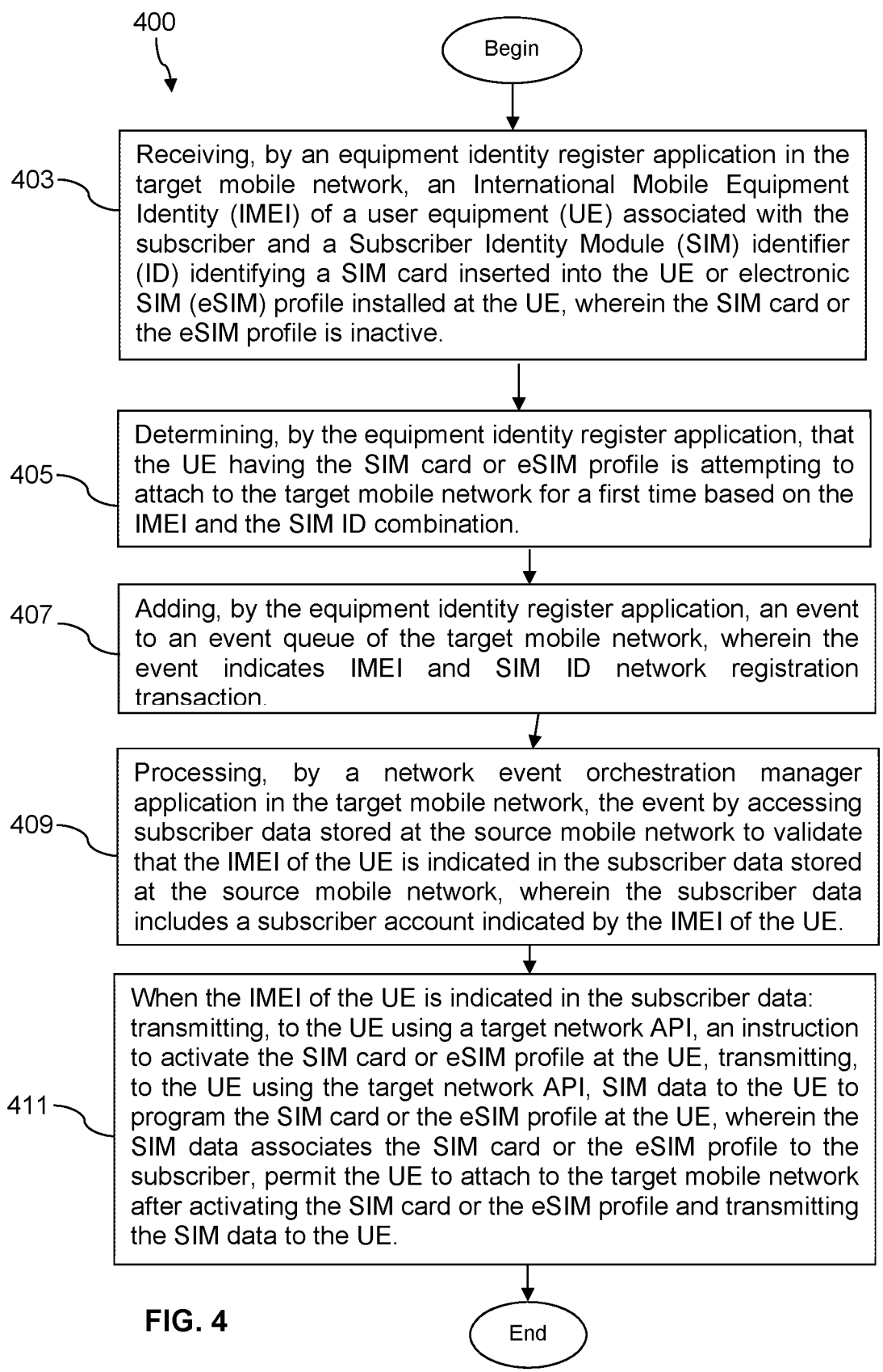
FIG. 4 is a flowchart of a third method performed by the communication system of FIG. 1 according to an embodiment of the disclosure.

Turning now to FIG. 4, a method 400 is described. Method 400 is performed after a subscriber performs to the SIM swap operation. Method 400 may be performed by the target mobile network 110.

At step 403, method 400 comprises receiving, by an EIR application 144 in the target mobile network 110, an IMEI of the UE 102 associated with the subscriber and a SIM ID 162 identifying a SIM card 117 inserted into the UE 102 or eSIM profile 119 installed at the UE 102. The SIM card 117 or the eSIM profile 119 is inactive.

At step 405, method 400 comprises determining, by the EIR application 144, that the UE 102 having the SIM card 117 or eSIM profile 119 is attempting to attach to the target mobile network 110 for a first time based on the combination of the IMEI of the UE 102 and the SIM ID 162 identifying the SIM card 117 or the eSIM profile 119.

At step 407, method 400 comprises adding, by the EIR application 144, an event to an event queue 156 of the target mobile network 110. The event indicates the IMEI of the UE 102 and the SIM ID 162 identifying the SIM card 117 or the eSIM profile 119 and indicating the network registration transaction.

At step 409, method 400 comprises processing, by an orchestration manager application 147 in the target mobile network 110, the event by accessing subscriber data 121 stored at the source mobile network 106 to validate that the IMEI of the UE 102 is indicated in the subscriber data 121 stored at the source mobile network 106. The subscriber data may include a subscriber account indicated by the IMEI of the UE 102. In an embodiment, the subscriber data may further comprise related cellular subscription profile and service features.

At step 411, method 400 comprises, when the IMEI of the UE 102 is indicated in the subscriber data 121, transmitting, to the UE 102 using a target mobile network API 141, an instruction to activate the SIM card 117 or eSIM profile 119 at the UE 102, transmitting, to the UE 102 using the target mobile network API 141, SIM data 154 to the UE 102 to program the SIM card 117 or the eSIM profile 119 at the UE 102, wherein the SIM data 154 associates the SIM card 117 or the eSIM profile 119 to the subscriber, and permit the UE 102 to attach to the target mobile network 110 after activating the SIM card 117 or the eSIM profile 119 and transmitting the SIM data 154 to the UE 102.

Once the UE 102 receives the instruction to activate the SIM card 117 or eSIM profile 119 at the UE 102, the UE 102 may perform the steps to program or activate the activate the SIM card 117 or eSIM profile 119 at the UE 102. In an embodiment, the target mobile network 110 may provision the UE 102 as a subscriber of the carrier corresponding to the target mobile network 110. The EIR application 144 may authenticate the UE 102 with the target mobile network 110, and the permit the UE 102 access to the target mobile network 110. Once the SIM card 117 or eSIM profile 119 has been activated at the UE 102, and the target mobile network 110 has fully authenticated and attached the UE 102 to the target mobile network 110, then the UE 102 has been fully provisioned with the target mobile network 110.

Figure 5A:
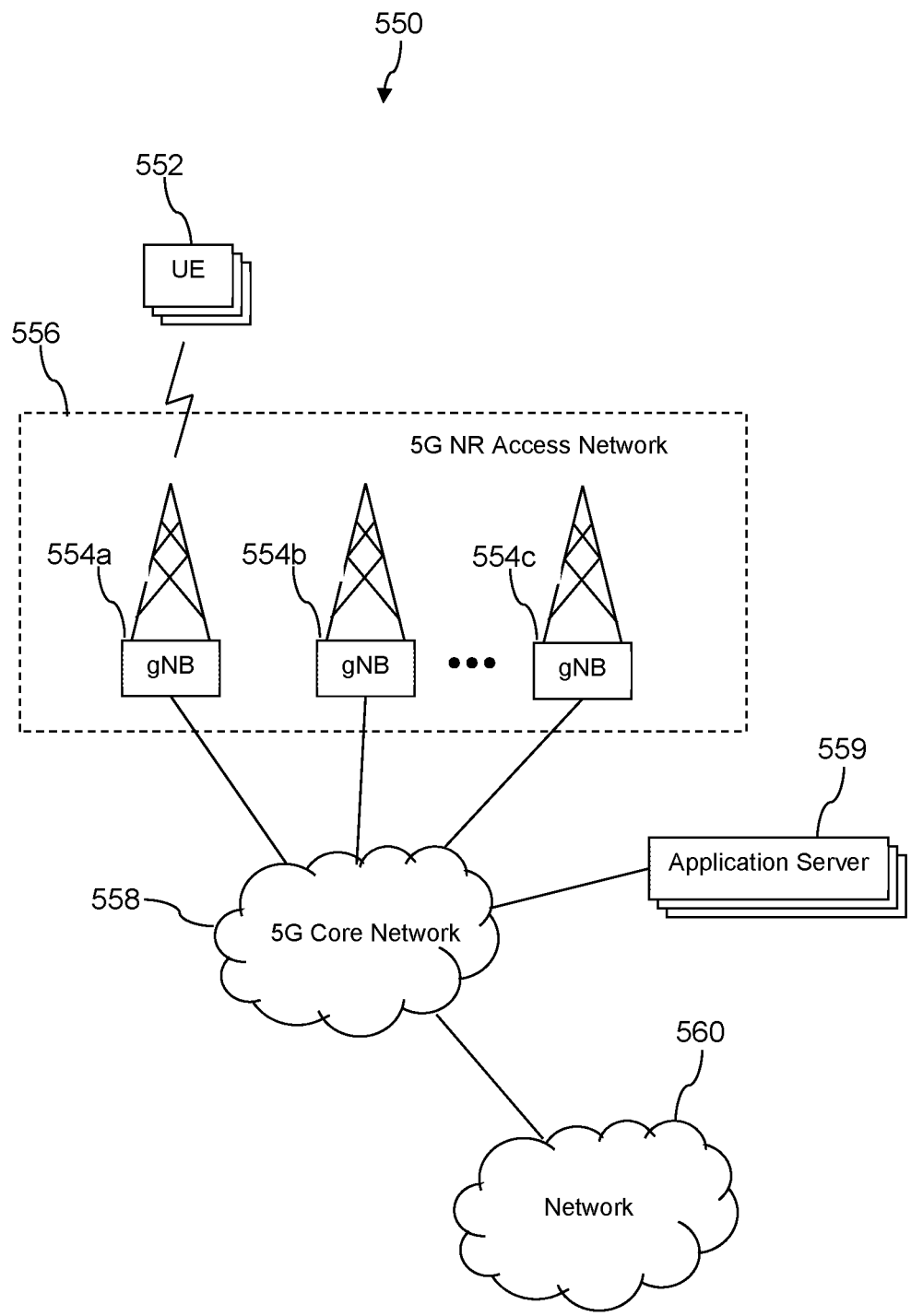
FIGS. 5A-B are block diagrams illustrating a communication system similar to the communication system of FIG. 1 according to an embodiment of the disclosure.

Turning now to FIG. 5A, an exemplary communication system 550 is described. In an embodiment, the communication system 550 may be implemented in the system 100 of FIG. 1. The communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
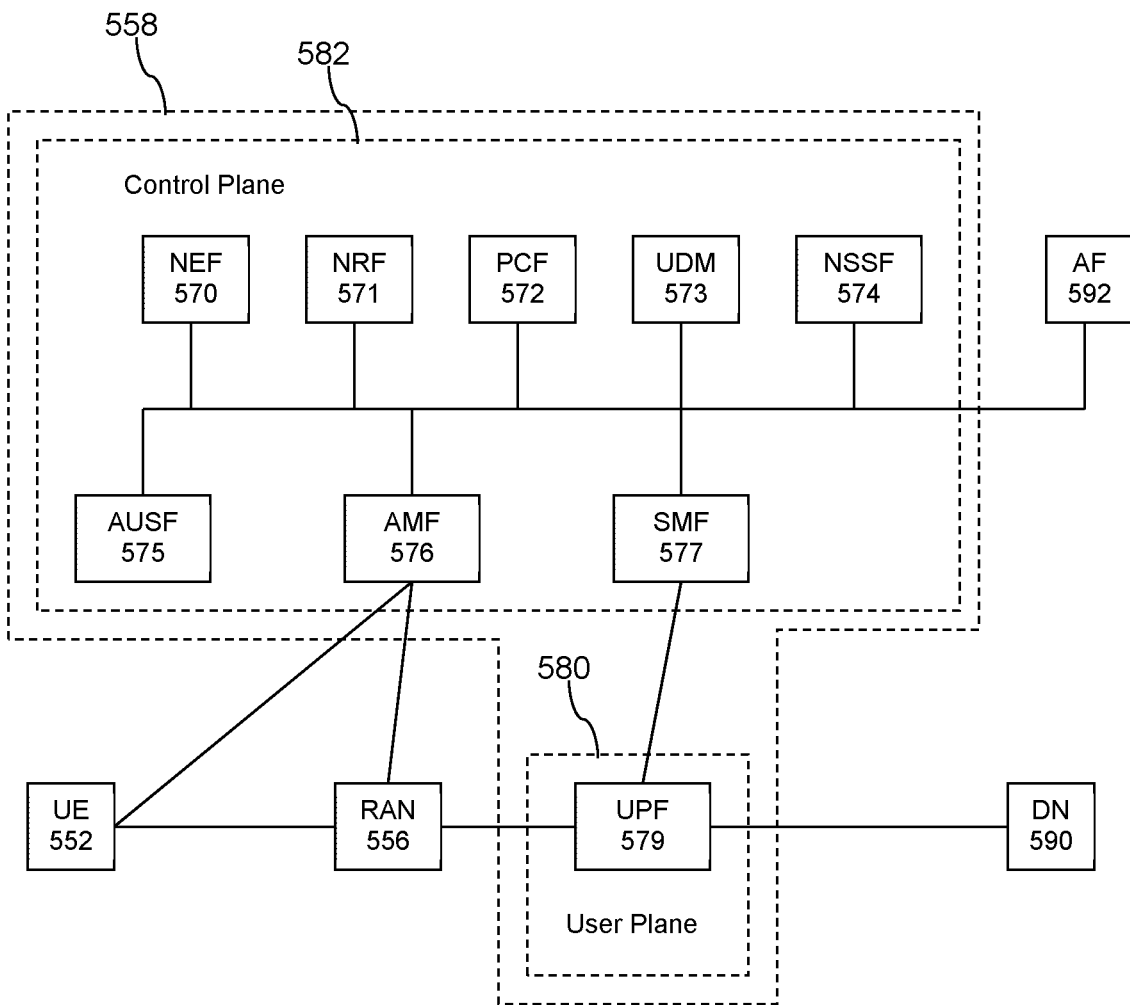

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
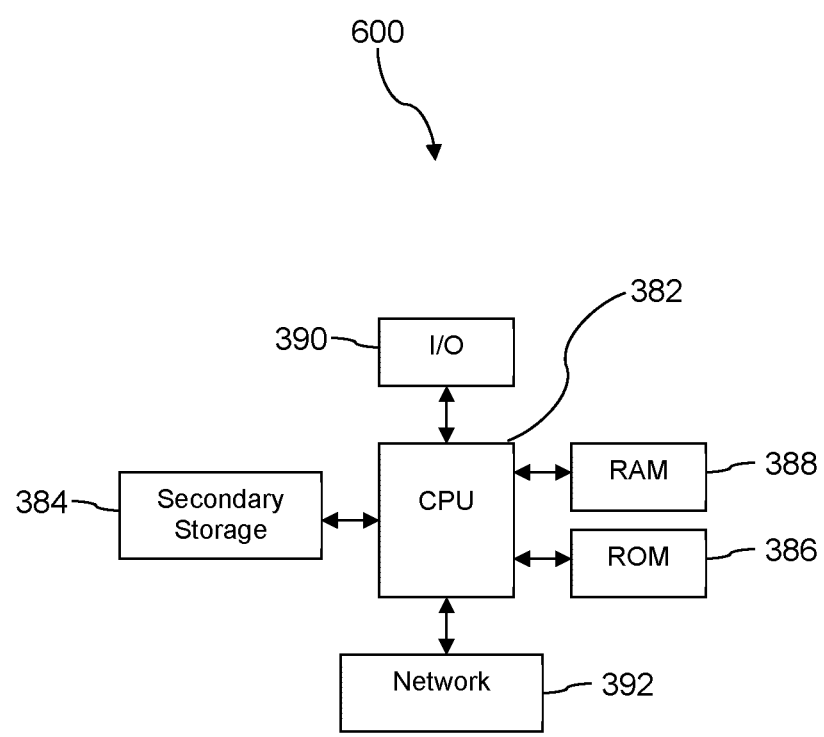
FIG. 6 is a block diagram of a computer system implemented within the communication system of FIG. 1 or FIGS. 5A-B according to an embodiment of the disclosure.

FIG. 6 illustrates a computer system 600 suitable for implementing one or more embodiments disclosed herein. In an embodiment, the EIR application 144 and/or the orchestration manager application 147 may be implemented as the computer system 600. The computer system 600 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 600, at least one of the CPU 382, the RAM 388, and the ROM 386 are changed, transforming the computer system 600 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 600 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 600 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 600 to provide the functionality of a number of servers that is not directly bound to the number of computers in the computer system 600. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 600, at least portions of the contents of the computer program product to the secondary storage 384, to the ROM 386, to the RAM 388, and/or to other non-volatile memory and volatile memory of the computer system 600. The processor 382 may process the executable instructions and/or data structures in part by directly accessing the computer program product, for example by reading from a CD-ROM disk inserted into a disk drive peripheral of the computer system 600. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 600.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 600 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for migrating a subscriber from a source mobile network associated with a source mobile network operator to a target mobile network associated with a target mobile network operator, wherein the method comprises:
   receiving, by an equipment identity register application in the target mobile network, an International Mobile Equipment Identity (IMEI) of a user equipment (UE) associated with the subscriber and a Subscriber Identity Module (SIM) identifier (ID) identifying a SIM card inserted into the UE or electronic SIM (eSIM) profile installed at the UE, wherein the SIM card or the eSIM profile is inactive;
   determining, by the equipment identity register application, that the UE having the SIM card or eSIM profile is attempting to attach to the target mobile network for a first time based on the IMEI of the UE and the SIM ID identifying the SIM card or the eSIM profile;
   adding, by the equipment identity register application, an event to an event queue of the target mobile network, wherein the event indicates the IMEI of the UE and the SIM ID identifying the SIM card or the eSIM profile; and
   processing, by a network event orchestration manager application in the target mobile network, the event by accessing subscriber data stored at the source mobile network to validate that the IMEI of the UE is indicated in the subscriber data stored at the source mobile network, wherein the subscriber data includes a subscriber account indicated by the IMEI of the UE;
   when the IMEI of the UE is indicated in the subscriber data:
      transmitting, to the UE using a target mobile network application program interface (API), an instruction to activate the SIM card or eSIM profile at the UE;
      transmitting, to the UE using the target mobile network API, SIM data to the UE to program the SIM card or the eSIM profile at the UE, wherein the SIM data associates the SIM card or the eSIM profile to the subscriber; and
      permitting the UE to attach to the target mobile network after activating the SIM card or the eSIM profile and transmitting the SIM data to the UE.

2. The method of claim 1, further comprising:
   determining, by the network event orchestration manager application, a source service for the subscriber that is to be migrated from the source mobile network operator to the target mobile network operator;
   determining, by the network event orchestration manager application, a target service provided by the target mobile network operator, wherein the target service matches the source service; and
   accessing, by the network event orchestration manager application, service data associated with the source service at the source mobile network to provide the target service to the UE.

3. The method of claim 2, wherein the source service and the target service are associated with at least one of billing services, voicemail services, text messaging services, or third-party application services.

4. The method of claim 1, further comprising registering, by the equipment identity register application, the IMEI of the UE and the SIM ID identifying the SIM card or the eSIM profile.

5. The method of claim 1, wherein the subscriber data remains stored at the source mobile network, without being stored at the target mobile network, while the UE accesses the target mobile network.

6. The method of claim 1, further comprising:
   receiving, by the target mobile network API, the subscriber data from the source mobile network; and
   storing, by the network event orchestration manager application, the subscriber data in a memory of the target mobile network.

7. The method of claim 1, wherein the SIM data includes a Mobile Subscriber Integrated Services Digital Network Number (MSISDN) identifying the subscriber.

8. The method of claim 1, further comprising deactivating, by the network event orchestration manager application, a cellular subscription of the subscriber from the source mobile network.

9. A method for migrating a subscriber from a source mobile network associated with a source mobile network operator to a target mobile network associated with a target mobile network operator, wherein the method comprises:
   receiving, by an equipment identity register application in the target mobile network, when a Subscriber Identity Module (SIM) card associated with the subscriber is inserted into a user equipment (UE), an International Mobile Equipment Identity (IMEI) of the UE and an International Mobile Subscriber Identifier (IMSI) of the SIM card, wherein the SIM card is inactive;
   determining, by the equipment identity register application, that a combination of the IMEI of the UE and the IMSI of the SIM card has not been previously registered with the target mobile network;
   adding, by the equipment identity register application, an event to an event queue of the target mobile network when the UE combination of the IMEI of the UE and the IMSI of the SIM card has not been previously registered with the target mobile network, wherein the event comprises the IMEI of the UE;
   processing, by a network event orchestration manager application in the target mobile network, the event by accessing subscriber data stored at the source mobile network to validate that the IMEI of the UE is indicated in the subscriber data stored at the source mobile network, wherein the subscriber data includes a subscriber account associated with the IMEI of the UE;
   migrating, by the network event orchestration manager application, the subscriber data at the source mobile network to the target mobile network by authorizing the target mobile network to access the subscriber data stored at the source mobile network to provide network services to the subscriber, without relocating the subscriber data from the source mobile network to the target mobile network; and
   transmitting, to the UE using a target mobile network application program interface (API), SIM data and an instruction to activate the SIM card, wherein the SIM data associates the SIM card to the subscriber when the IMEI of the UE is indicated in the subscriber data.

10. The method of claim 9, further comprising deactivating a cellular subscription of the subscriber from the source mobile network.

11. The method of claim 9, further comprising:
determining, by the network event orchestration manager application, a source service for the subscriber that is to be migrated from the source mobile network operator to the target mobile network operator;
determining, by the network event orchestration manager application, a target service provided by the target mobile network operator, wherein the target service matches the source service; and
accessing, by the network event orchestration manager application, service data associated with the source service at the source mobile network to provide the target service to the UE.

12. The method of claim 11, wherein the source service and the target service are associated with at least one of billing services, voicemail services, text messaging services, or third-party application services.

13. The method of claim 9, further comprising registering, by the equipment identity register application, the IMEI of the UE and the IMSI of the SIM card.

14. The method of claim 9, wherein the SIM data includes an MSISDN identifying the subscriber.

15. A system comprising:
at least one processor;
at least one non-transitory memory;
an equipment identity register application, stored in the at least one non-transitory memory, which when executed by the at least one processor, causes the at least one processor to be configured to:
determine that a combination of an International Mobile Equipment Identity (IMEI) of a user equipment (UE) and a Subscriber Identity Module (SIM) identifier (ID) has not been previously registered with a target mobile network, wherein the SIM ID identifies a SIM card inserted into the UE or electronic SIM (eSIM) profile installed at the UE, wherein the SIM card or the eSIM profile is inactive; and add an event to an event queue when the combination of the IMEI of the UE and the SIM ID identifying the SIM card or the eSIM profile has not been previously registered with the target mobile network, wherein the event indicates the combination of the UE with the SIM card or eSIM profile;
a network event orchestration manager application, stored in the at least one non-transitory memory, which when executed by the at least one processor, causes the at least one processor to be configured to:
process the event by accessing subscriber data stored at a source mobile network to validate that the IMEI of the UE is indicated in the subscriber data stored at the source mobile network, wherein the subscriber data includes a subscriber account associated with the IMEI of the UE;
transmit, to the UE using a target application program interface (API), an instruction to activate the SIM card or eSIM profile at the UE; and
transmit, using the target network API, SIM data to the UE to program the SIM card or the eSIM profile at the UE, wherein the SIM data associates the SIM card or the eSIM profile to the subscriber.

16. The system of claim 15, wherein the equipment identity register application further causes the at least one processor to be configured to register the IMEI of the UE and the SIM ID identifying the SIM card or the eSIM profile.

17. The system of claim 15, wherein the subscriber data remains stored at the source mobile network, without being stored at the target mobile network, while the UE accesses the target mobile network.

18. The system of claim 15, wherein the network event orchestration manager application further causes the at least one processor to:
receive, by the target network API, the subscriber data from the source mobile network; and
store the subscriber data in a memory of the target mobile network.

19. The system of claim 15, wherein the SIM data includes an MSISDN identifying the subscriber.

20. The system of claim 15, wherein the network event orchestration manager application further causes the at least one processor to deactivate a cellular subscription of the subscriber from the source mobile network.

* * * * *